United States Patent
Tu et al.

(10) Patent No.: US 7,778,261 B2
(45) Date of Patent: Aug. 17, 2010

(54) USING PSTN TO COMMUNICATE IP ADDRESS FOR POINT-TO-POINT TEXT, VOICE, VIDEO, OR DATA COMMUNICATION

(75) Inventors: JianMing Tu, Shanghai (CN); Hui Deng, San Ramon, CA (US)

(73) Assignee: ArcSoft (Shanghai) Technology, Shanghai (CN)

( * ) Notice: Subject to any disclaimer, the term of this patent is extended or adjusted under 35 U.S.C. 154(b) by 1291 days.

(21) Appl. No.: 11/280,688

(22) Filed: Nov. 15, 2005

(65) Prior Publication Data

US 2007/0110033 A1   May 17, 2007

(51) Int. Cl.
H04L 12/28 (2006.01)
H04L 12/56 (2006.01)
G06F 15/16 (2006.01)
H04J 3/16 (2006.01)
H04Q 11/00 (2006.01)

(52) U.S. Cl. ........................ 370/401; 709/228
(58) Field of Classification Search ............. 370/395.54
See application file for complete search history.

(56) References Cited

U.S. PATENT DOCUMENTS

| | | | |
|---|---|---|---|
| 6,847,637 B1 | 1/2005 | Abiven | |
| 6,907,034 B1 * | 6/2005 | Begis | ......................... 370/354 |
| 2002/0085561 A1 | 7/2002 | Choi et al. | |
| 2002/0191769 A1 | 12/2002 | Duponchel et al. | |
| 2005/0220045 A1 * | 10/2005 | Lin | ............................. 370/313 |

FOREIGN PATENT DOCUMENTS

| | | | |
|---|---|---|---|
| CA | 2242495 A1 * | 1/2000 | |
| EP | 1235416 A1 | 8/2002 | |
| EP | 1515506 A1 | 3/2005 | |
| EP | 1519516 A2 | 3/2005 | |
| GB | 2315192 A | 1/1998 | |

OTHER PUBLICATIONS

J. Rosenburg, C. Chitema, R. Mahy, Simple Traversal of UDP through Network Address Translators (STUN), Network Working Group—RFC 3489, Mar. 2003, pp. 1-47.*

(Continued)

*Primary Examiner*—Daniel J Ryman
*Assistant Examiner*—Christopher Crutchfield
(74) *Attorney, Agent, or Firm*—Patent Law Group LLP; David C. Hsia

(57) ABSTRACT

A first device uses a PSTN to send its public IP address to a second device to setup point-to-point communication over the Internet. The first device calls the second device over the PSTN. In one embodiment, the second device answers the call and the first device transmits its public IP address over the connected call to the second device. In another embodiment, the second device does not answer and the PSTN transmits the public IP address as signals in several intervals between telephone rings to the second device. The second device then sends a connection request to the first device over the Internet using the IP address. Once the connection over the Internet has been established, the first and the second devices point-to-point exchange data packets carrying text, voice, video, or data communications between their users.

15 Claims, 8 Drawing Sheets

OTHER PUBLICATIONS

C. Aoun, Potential Solutions to the Middle Box discovery problem, MIDCOM Working Draft, May 2002, pp. 1-20.*

J. Rosenburg, Internet Connectivity Establishment (ICE): A methodology for Network Address Translation Traversal for Offer/Answer Protocols, Internet Engineering Task Force Draft, Oct. 19, 2005, pp. 1-82.*

O. T. Satyanarayanan et al., "Management of NAT-based Private Networks," Integrated Network Management, 2005 IM 2005. 2005 9th IFIP/IEEE International Symposium on Nice, France May 15-19, 2005, Piscataway, NJ, USA, IEEE May 15, 2005, pp. 573-586.

Jaewook Shin et al., "Gateway Discovery and Routing in Ad Hoc Networks with NAT-based Internet Connectivity," Vehicular Technology Conference, 2004. VTC2004-Fall. 2004 IEEE 60TH Los Angeles, CA, USA Sep. 26-29, 2004, Piscataway, NJ, USA, IEEE, vol. 4, Sep. 26, 2004, pp. 2883-2886.

Christian Prehofer et al., Scalable Resource Management Architecture for VoIP, Jun. 1, 2005, Retrieved from the Internet: URL: http://web.archive.org/web/20050601001638/http://www.prehofer.de/Papers/Proms-paper-2000.pdf. Retrieved on Jul. 9, 2008, pp. 1-10.

Maszul, Kingging, "Auto discovery of gateway IP?," Java Programming—Developer Forums [On line] Jan. 30, 2004, Retrieved from the Internet: URL: http://forum.java.sun.com/thread.jspa?threadId=486600&messageID=2280255. [retrieved on Jul. 9, 2008], 1 page.

International Search Report and Written Opinion, 25 pages.

* cited by examiner

USING PSTN TO COMMUNICATE IP ADDRESS FOR POINT-TO-POINT TEXT, VOICE, VIDEO, OR DATA COMMUNICATION

FIELD OF INVENTION

This invention relates to Internet-based telephony and teleconferencing, and more specifically point-to-point text, voice, video, or data communication over the Internet without login into a central directory such as a H.323 or a SIP server.

DESCRIPTION OF RELATED ART

FIG. 1 illustrates a conventional Internet Protocol (IP) communication system 100 that uses a centralized directory 102 to establish a connection between IP devices 104 and 106 over a public computer network 108 (e.g., the Internet). Centralized directory 102 associates static usernames and identities with IP addresses that are likely to change. A change in IP address can occur when a user relocates or reconnects to a network with a dynamic IP address. Centralized directory 102 logs each username and IP address and keeps track of whether users are online or not. When a first user at IP device 104 wishes to communicate with a second user at IP device 106, the first user requests the IP address of the second user from centralized directory 102 and then uses the IP address to establish a connection with the second user over public computer network 108.

Centralized directories become costly when the user base scales into the millions. Furthermore, many traditional telephone users are more comfortable with dialing telephone numbers than login into computers. Thus, what is needed is an IP communication system without a centralized directory that is more familiar to traditional telephone users.

BRIEF DESCRIPTION OF THE DRAWINGS

Use of the same reference numbers in different figures indicates similar or identical elements.

SUMMARY

In one embodiment of the invention, a first device uses a PSTN to send its public IP address to a second device to setup point-to-point communication over the Internet. The first device calls the second device over the PSTN. In one embodiment, the second device answers the call and the first device transmits its public IP address over the connected call to the second device. In another embodiment, the second device does not answer and the PSTN transmits the public IP address as signals in several intervals between telephone ring signals to the second device. The second device then sends a connection request to the first device over the Internet using the IP address. Once the connection over the Internet has been established, the first and the second devices point-to-point exchange data packets carrying text, voice, video, or data communications between their users.

In one embodiment, where both the first and the second devices are in private networks so they do not have public IP addresses, the first device sends a trace router command to a random valid IP address. In response, a router sends back the IP address list in this traced route. The first device will determine the gateway public IP address or the nearest router IP public address as its closest node. Using the public IP address of the closest node, the first device sends a data packet to neighboring devices that could know and reply to the data packet. The data packet is sent to the neighboring devices near a closed node network segment requesting their confirmation and their public IP addresses. The first device calls the second device over the PSTN and provides the public IP addresses of its neighboring devices. The second device then sends connection requests to the neighboring devices over the Internet. Once connections over the Internet have been established between the second device and the neighboring devices, the first and the second devices exchange data packets carrying text, voice, or video communications between their users through the neighboring devices. The neighboring devices act as login server.

DETAILED DESCRIPTION

Figure 1:
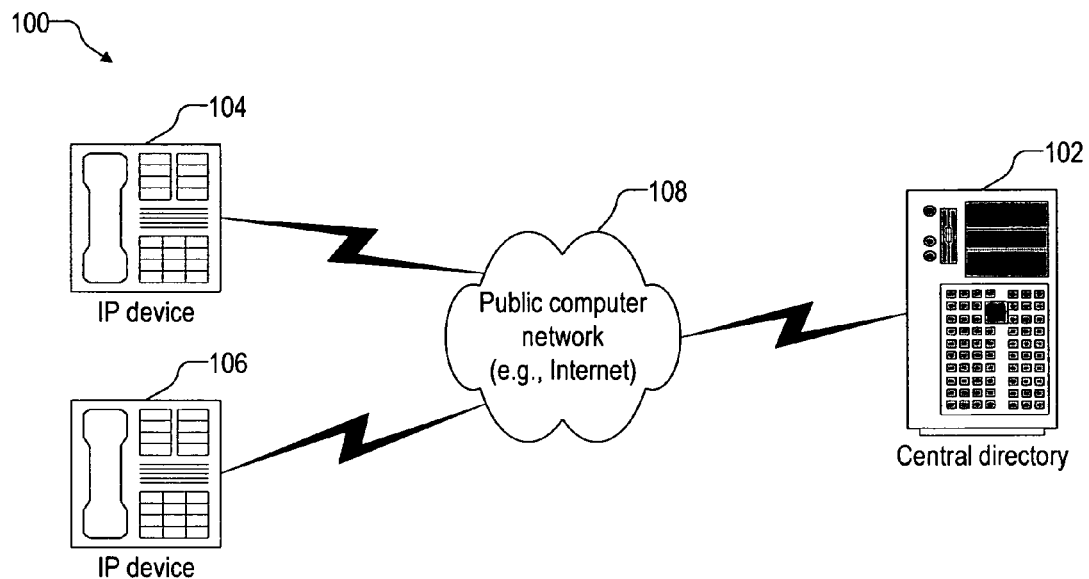
FIG. 1 illustrates a conventional system for communication over a public computer network.
Figure 2A:
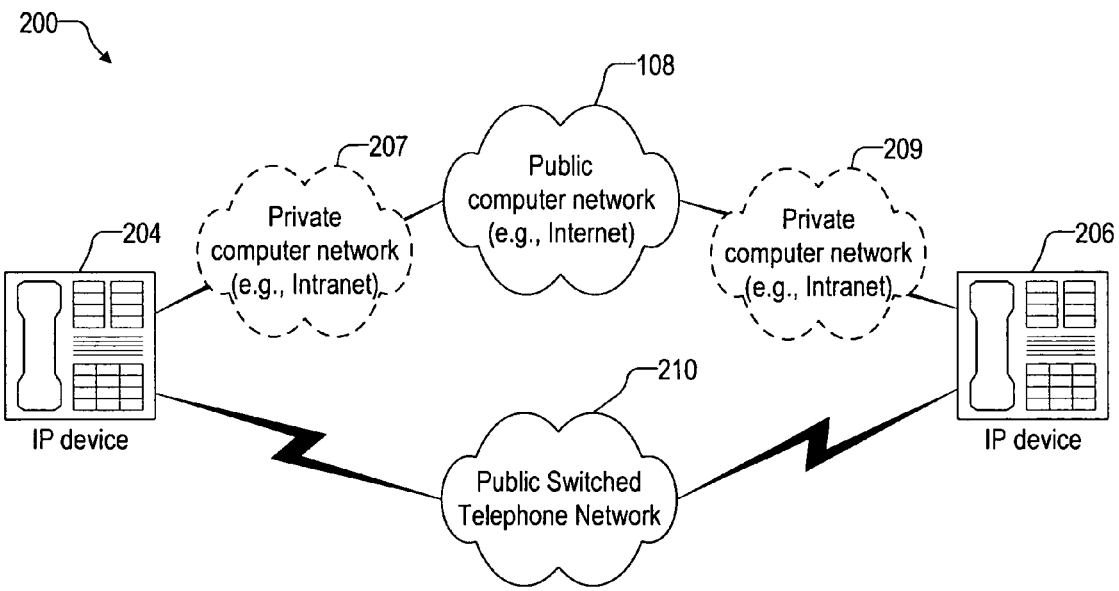
FIG. 2A illustrates a system for using a public switched telephone network (PSTN) to setup communication over a public computer network in one embodiment of the invention.

FIG. 2A illustrates an IP communication system 200 without a centralized directory in one embodiment of the invention. IP communication system 200 includes IP devices 204 and 206 connected to public computer network 108 (e.g., the Internet). IP devices 204 and 206 may be connected to public computer network 108 through private computer networks 207 and 209 (e.g., Intranets), respectively. IP devices 204 and 206 are also connected to a PSTN 210. IP devices 204 and 206 use PSTN 210 to communicate an IP address for establishing a connection over public computer network 108.

Figure 2B:
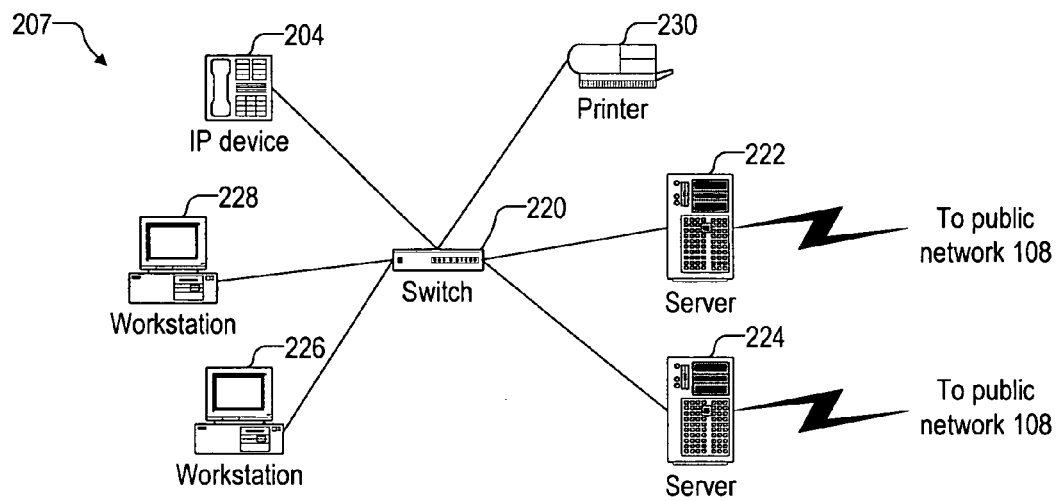
FIG. 2B illustrates a private network in the system of FIG. 2A in one embodiment of the invention.

FIG. 2B illustrates a private computer network 207 of FIG. 2A in one embodiment of the invention. Private computer network 207 includes a switch 220 that interconnects devices 204, 222, 224, 226, 228, and 230 so they can communicate with each other. Devices 222 and 224 are connected to public computer network 108 and may serve as gateways for the other devices to public computer network 108.

Figure 3:
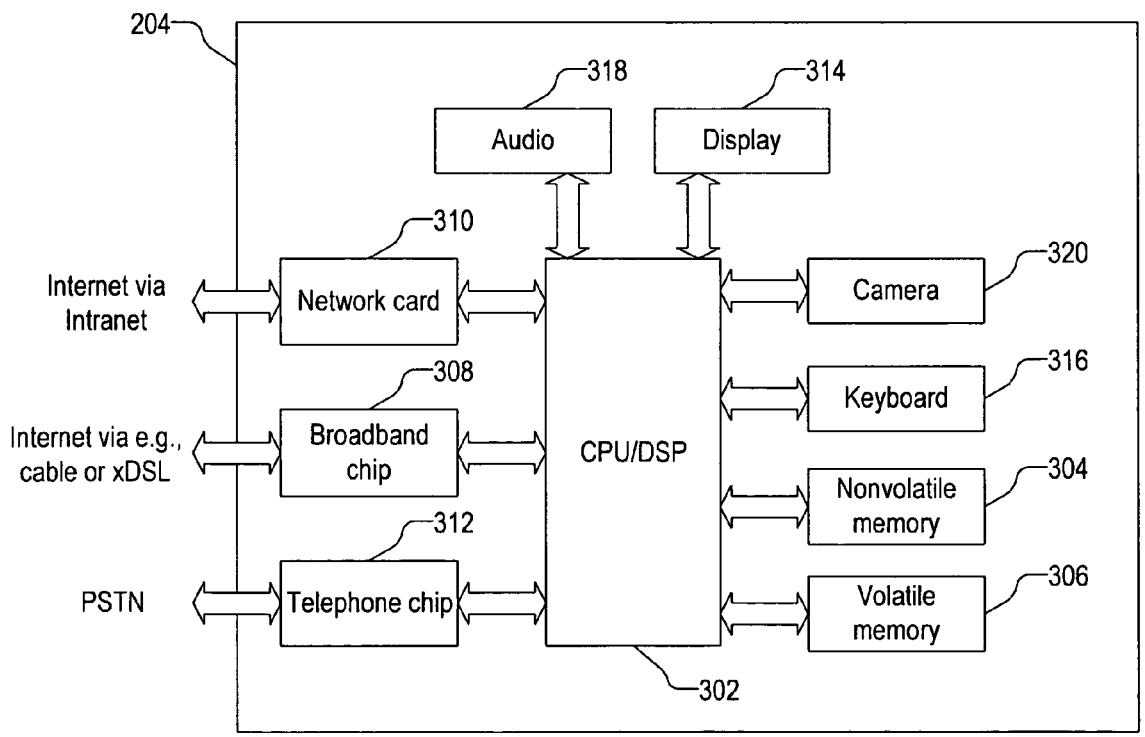
FIG. 3 illustrates an IP device used in the system of FIG. 2 in one embodiment of the invention.

FIG. 3 illustrates IP device 204 in one embodiment of the invention. IP device 204 has the form factor of a telephone or a videophone. IP device 204 includes a central processing unit (CPU) or digital signal processor (DSP) 302 that executes IP communication software loaded from nonvolatile memory 304 to volatile memory 306. CPU 302 uses a broadband chip 308 to access public computer network 108 by cable or xDSL (digital subscriber line). Alternatively, CPU 302 uses a network card 310 to access public computer network 108 through a private network (e.g., an Intranet). CPU 302 uses a telephone chip 312 to access PSTN 210. Telephone chip 312 includes a modem for generating and receiving signals over PSTN 210. For text, voice, and video communications, CPU 302 may be further connected to peripherals including a display 314, a keypad or keyboard 316, microphone and speaker 318, and a camera 320. IP device 206 is similarly implemented as IP device 204.

Figure 4:
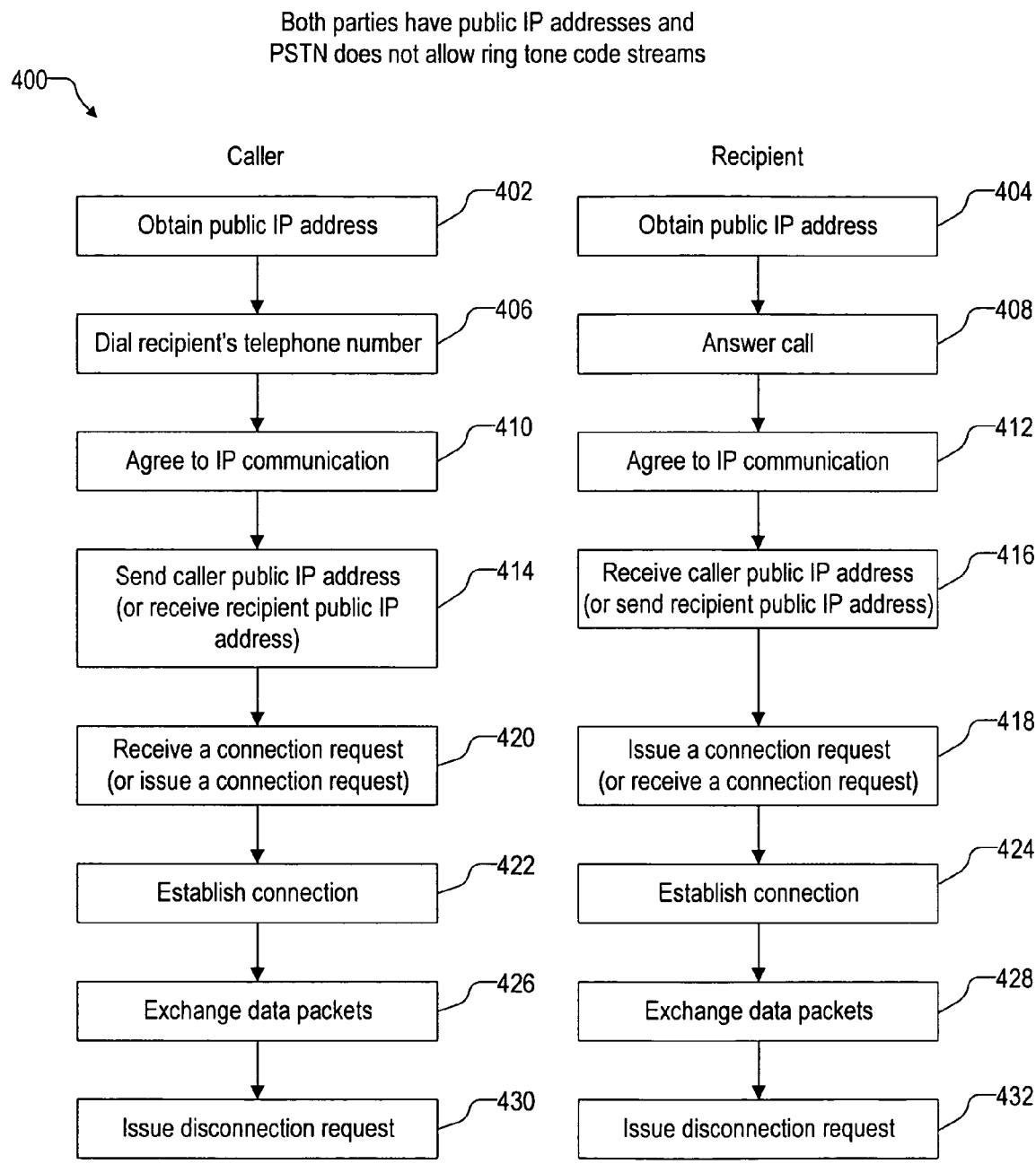
FIGS. 4 to 9 are flowcharts of methods for using the PSTN to setup communication over a public computer network in embodiments of the invention.

FIG. 4 illustrates a method 400 for parties to communicate using IP communication system 200 in one embodiment of the invention. Method 400 is used when (1) both IP devices 204 and 206 have public IP addresses and (2) PSTN 210 does not allow a modem message from a caller to a recipient between telephone rings. To demonstrate method 400, assume a caller is using IP device 204 and a recipient is using IP device 206. The actions of the caller and IP device 204 are shown in the left column while the actions of the recipient and IP device 206 are shown in the right column.

In step 402, IP device 204 optionally obtains its dynamic public IP address if IP device 204 does not have a static public IP address. Typically, a public computer network service provider (e.g., an Internet service provider) assigns a static or a dynamic public IP address to IP device 204 depending on the subscribed serve of the user. IP device 204 simply queries its service provider for its current dynamic public IP address.

In step 404, IP device 206 optionally obtains its dynamic public IP address if IP device 206 does not have a static public IP address.

In step 406, the caller uses IP device 204 to dial a telephone number associated with the recipient or IP device 206 (e.g., the recipient's telephone number assigned by the telephone company). IP device 204 dials over PSTN 210 to connect with IP device 206.

In step 408, the recipient uses IP device 206 to answer the telephone call from the caller over PSTN 210.

In steps 410 and 412, the caller and the recipient verbally agree to continue their communication over public computer network 108. In one embodiment, the recipient presses a button on IP device 206 and in response IP device 206 waits to receive a public IP address from IP device 204 over PSTN 210.

In step 414, the caller instructs IP device 204 to send its public IP address to IP device 206. In one embodiment, the caller presses a button on IP device 204 and in response IP device 204 sends its public IP address to IP device 206 over PSTN 210. IP device 204 can transmit its public IP address as a series of tones. For example, if IP device 204 has a public IP address of "213.65.88.26," IP device 204 can transmit in standard touch-tones of "###213*65*88*26###." "###" indicate the start and the end of the public IP address while "*" indicate the dot between octets in the public IP address. IP device 204 may include a redundancy check (e.g., a checksum) in the series of tones so IP device 206 can verify the accuracy of the tones and request retransmission of the tones when there is an error. Alternatively, IP device 204 can use tones having frequencies that are inaudible to human, or use another type of modem signaling to transmit its public IP address.

In step 416, IP device 206 receives the public IP address of IP device 204 over PSTN 210. Alternatively, the recipient instructs IP device 206 to send its public IP address to IP device 204 and the caller instructs IP device 204 to receive the public IP address of IP device 206.

In step 418, IP device 206 issues a connection request to IP device 204 over public computer network 108 using the public IP address of IP device 204.

In step 420, IP device 204 receives the connection request from IP device 206 over public computer network 108. In the connection request, IP device 204 receives the public IP address of IP device 206 and uses it to communicate with IP device 206. Alternatively, IP device 204 issues the connection request to IP device 204 over public computer network 108 and IP device 206 receives the connection request from IP device 204 over public computer network 108.

In steps 422 and 424, IP devices 204 and 206 establish a connection over public computer network 108.

In steps 426 and 428, IP devices 204 and 206 exchange data packets carrying text, voice, or video communication between the caller and the recipient through their connection over public computer network 108.

In steps 430 and 432, the caller and the recipient decide to end the communication and instruct IP devices 204 and 206 to terminate their connection over public computer network 108.

Figure 5:
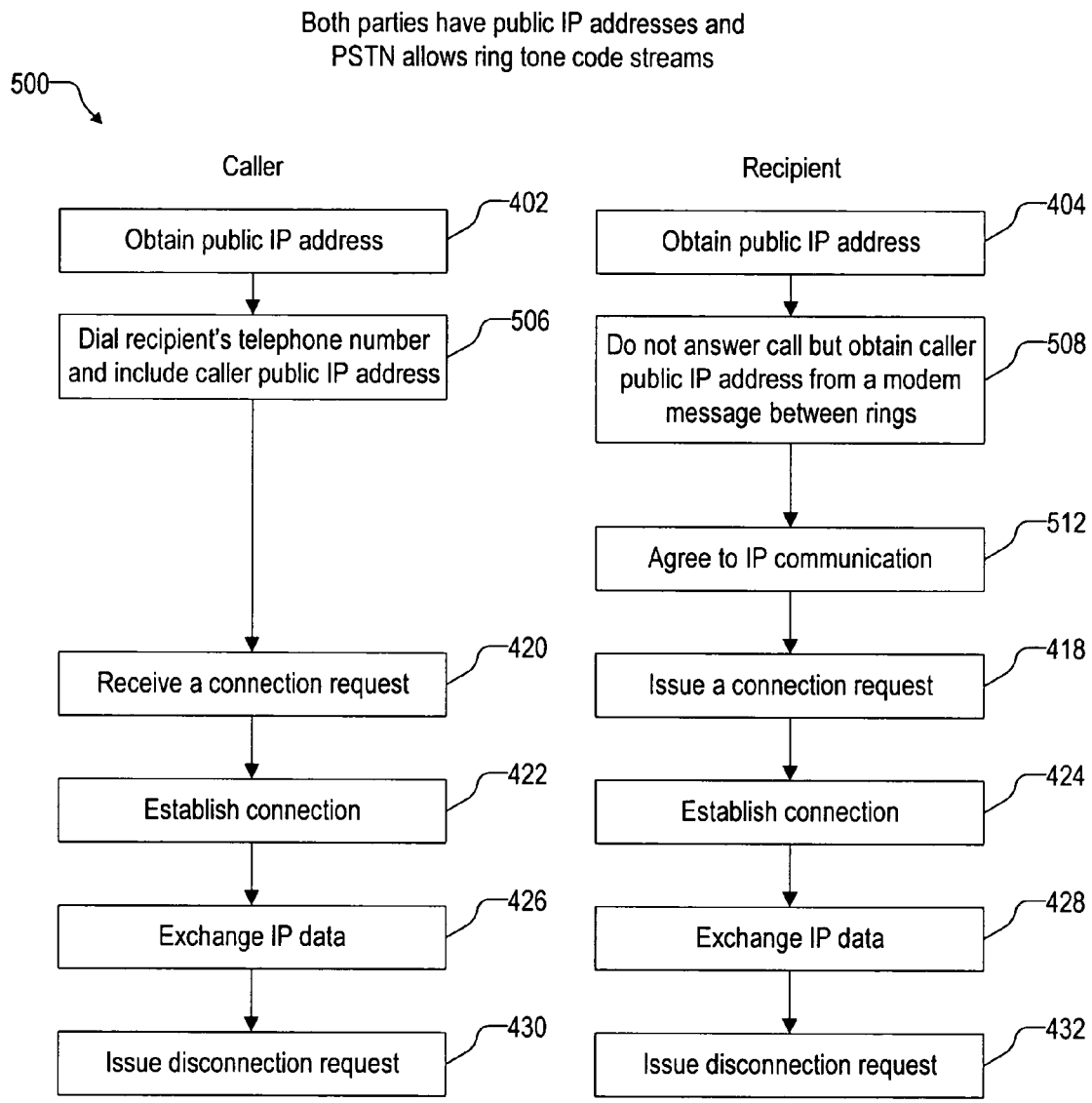

FIG. 5 illustrates a method 500 for parties to communicate using IP communication system 200 in one embodiment of the invention. Method 500 is used when (1) both IP devices 204 and 206 have public IP addresses and (2) PSTN 210 allows a modem message from a caller to a recipient between telephone rings. Method 500 is similar to method 400 except that steps 506, 508, and 512 have replaced steps 406, 408, and 412, and that steps 410, 414, and 414 have been eliminated.

In step 402, IP device 204 optionally obtains its dynamic public IP address if IP device 204 does not have a static public IP address.

In step 404, IP device 206 optionally obtains its dynamic public IP address if IP device 204 does not have a static public IP address.

In step 506, the caller uses IP device 204 to dial the recipient's telephone number. In response, IP device 204 includes both the recipient's telephone number and its public IP address in the touch-tones used to dial out over PSTN 210. PSTN 210 uses the recipient's telephone number to ring IP device 206 and then transmits a modem message with the public IP address of IP device 204. The modem message can be transmitted using frequency-shift keying (FSK) or dual-tone multifrequency (DTMF) signaling between telephone rings.

In step 508, IP device 206 does not answer the call from IP device 204 but obtains the public IP address of IP device 204 from the modem message between telephone rings.

In step 512, the recipient agrees to communicate with the caller over public computer network 108. In one embodiment, the recipient presses a button on IP device 206 to accept.

In step 418, IP device 206 issues a connection request to IP device 204 over public computer network 108 using the public IP address of IP device 204.

In step 420, IP device 204 receives the connection request from IP device 206 over public computer network 108. In the connection request, IP device 204 receives the public IP address of IP device 206 and uses it to communicate with IP device 206.

In steps 422 and 424, IP devices 204 and 206 establish a connection over public computer network 108.

In steps 426 and 428, IP devices 204 and 206 exchange data packets carrying text, voice, or video communication between the caller and the recipient through their connection over public computer network 108.

In steps 430 and 432, the caller and the recipient decide to end the communication and instruct IP devices 204 and 206 to terminate their connection over public computer network 108.

Figure 6:
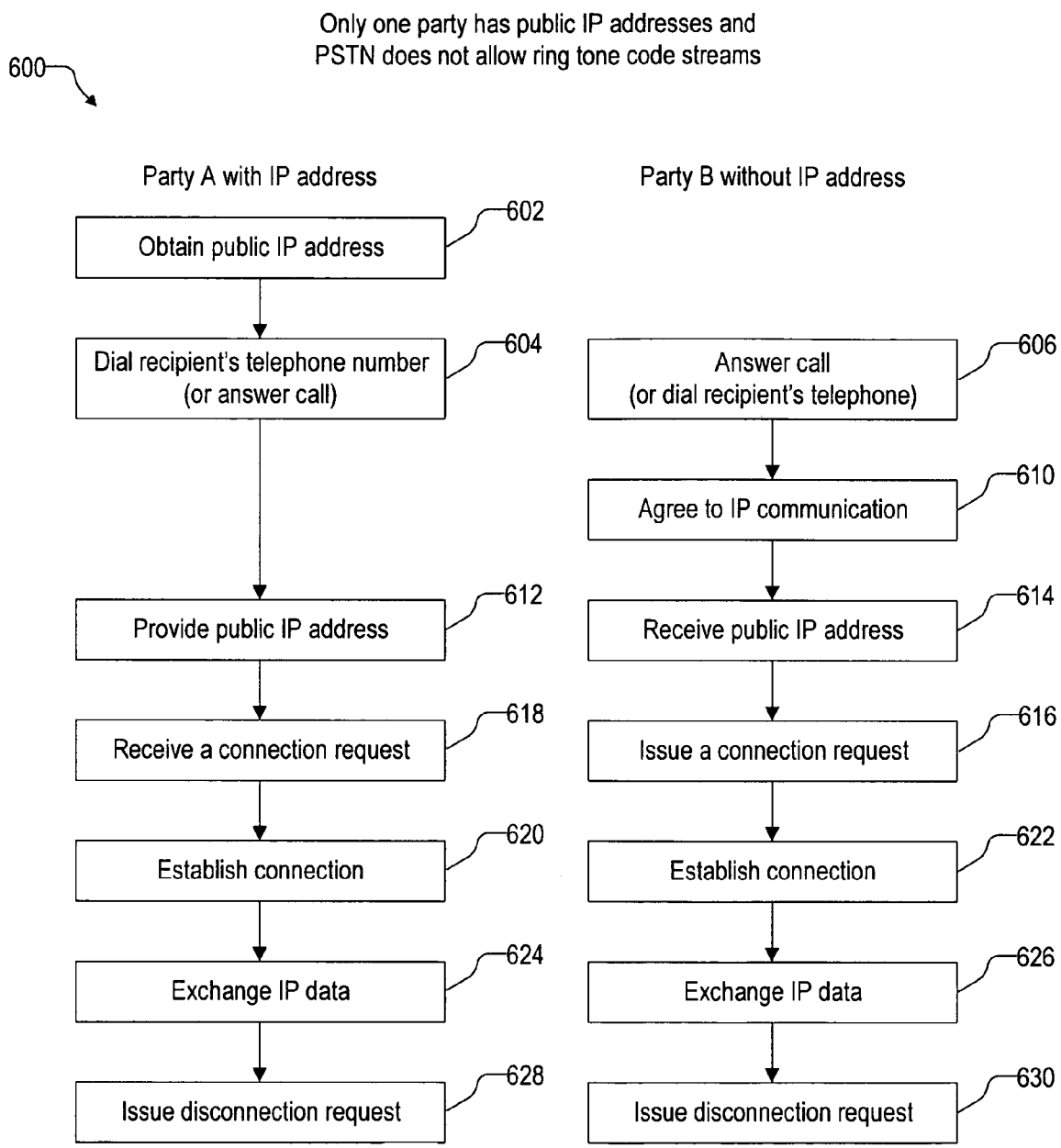

FIG. 6 illustrates a method 600 for two parties to communicate using IP communication system 200 in one embodiment of the invention. Method 600 is used when (1) only one of IP devices 204 and 206 has a public IP address and (2) PSTN 210 does not allow a modem message from a caller to a recipient between telephone rings. To demonstrate method 600, assume a party A is using IP device 204 with a public IP address and a party B is using IP device 206 without a public IP address. IP device 206 may not have a public IP address because it is connected through private computer network 209 to public computer network 108. The actions of party A and IP device 204 are shown in the left column while the actions of party B and IP device 206 are shown in the right column.

In step 602, IP device 204 optionally obtains its dynamic public IP address if IP device 204 does not have a static public IP address.

In step 604, party A uses IP device 204 to dial the party B's telephone number. IP device 204 dials over PSTN 210 to connect with IP device 206.

In step 606, party B uses IP device 206 to answer the telephone call from party A over PSTN 210. Alternatively, party B dials party A's telephone number and party A answers the telephone call from party B.

In steps 608 and 610, parties A and B verbally agree to continue their communication over public computer network 108. In one embodiment, party B presses a button on IP device 206 and in response IP device 206 waits to receive a public IP address from IP device 204 over PSTN 210.

In step 612, party A instructs IP device 204 to send its public IP address to IP device 206 over PSTN 210. In one embodiment, party A presses a button on IP device 204 and in response IP device 204 sends its public IP address to IP device 206. As described above, IP device 204 can transmit its public IP address as a series of tones or any other type of modem signaling.

In step 614, IP device 206 receives the public IP address of IP device 204 over PSTN 210.

In step 616, IP device 206 issues a connection request to IP device 204 over public computer network 108 using the public IP address of IP device 204.

In step 618, IP device 204 receives the connection request from IP device 206 over public computer network 108. In the connection request, IP device 204 receives the public IP address of IP device 206 and uses it to communicate with IP device 206.

In steps 620 and 622, IP devices 204 and 206 establish a connection over public computer network 108.

In steps 624 and 626, IP devices 204 and 206 exchange data packets carrying text, voice, or video communication between parties A and B through their connection over public computer network 108.

In steps 628 and 630, parties A and B decide to end the communication and instruct IP devices 204 and 206 to terminate their connection over public computer network 108.

Note that method 600 is similar to method 400 except that party A having IP device 204 with the public IP address must be the party providing the public IP address while party B having IP device 206 without the public IP address must be the party issuing a connection request.

Figure 7:
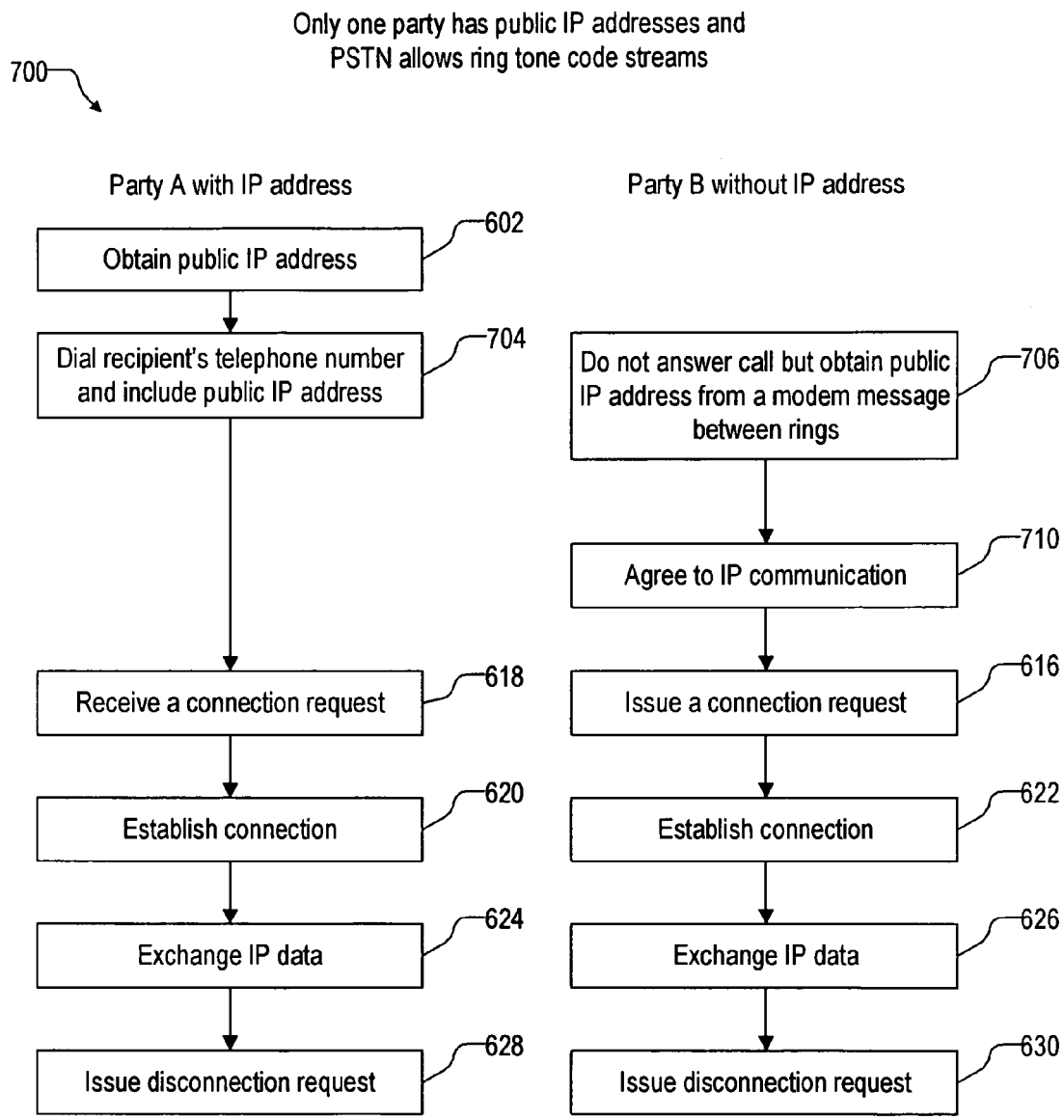

FIG. 7 illustrates a method 700 for parties to communicate using IP communication system 200 in one embodiment of the invention. Method 700 is used when (1) only one of IP devices 204 and 206 have a public IP address and (2) PSTN 210 allows a modem message from a caller to a recipient between telephone rings. Method 700 is similar to method 600 except that steps 704, 706, and 710 have replaced steps 604, 606, and 610, and that steps 612 and 614 have been eliminated.

In step 602, IP device 204 optionally obtains its dynamic public IP address if IP device 204 does not have a static public IP address.

In step 704, party A uses IP device 204 to dial party B's telephone number. In response, IP device 204 includes both the recipient's telephone number and its public IP address in the touch-tones used to dial out over PSTN 210. PSTN 210 uses the recipient's telephone number to ring IP device 206 and then transmits a modem message with the public IP address of IP device 204 between telephone rings.

In step 706, IP device 206 does not answer the call from IP device 204 but obtains the public IP address of IP device 204 from the modem message between telephone rings.

In step 710, party B agrees to communicate with party A over public computer network 108. In one embodiment, party B presses a button on IP device 206 to accept.

In step 616, IP device 206 issues a connection request to IP device 204 over public computer network 108.

In step 618, IP device 204 receives the connection request from IP device 206 over public computer network 108. In the connection request, IP device 204 receives the public IP address of IP device 206 and uses it to communicate with IP device 206.

In steps 620 and 622, IP devices 204 and 206 establish a connection over public computer network 108.

In steps 624 and 626, IP devices 204 and 206 exchange data packets carrying text, voice, or video communication between parties A and B through their connection over public computer network 108.

In steps 628 and 630, parties A and B decide to end the communication and instruct IP devices 204 and 206 to terminate their connection over public computer network 108.

Note that method 700 is also similar to method 500 except that party A having IP device 204 with the public IP address must be the party providing the public IP address while party B having IP device 206 without the public IP address must be the party issuing a connection request.

Figure 8:
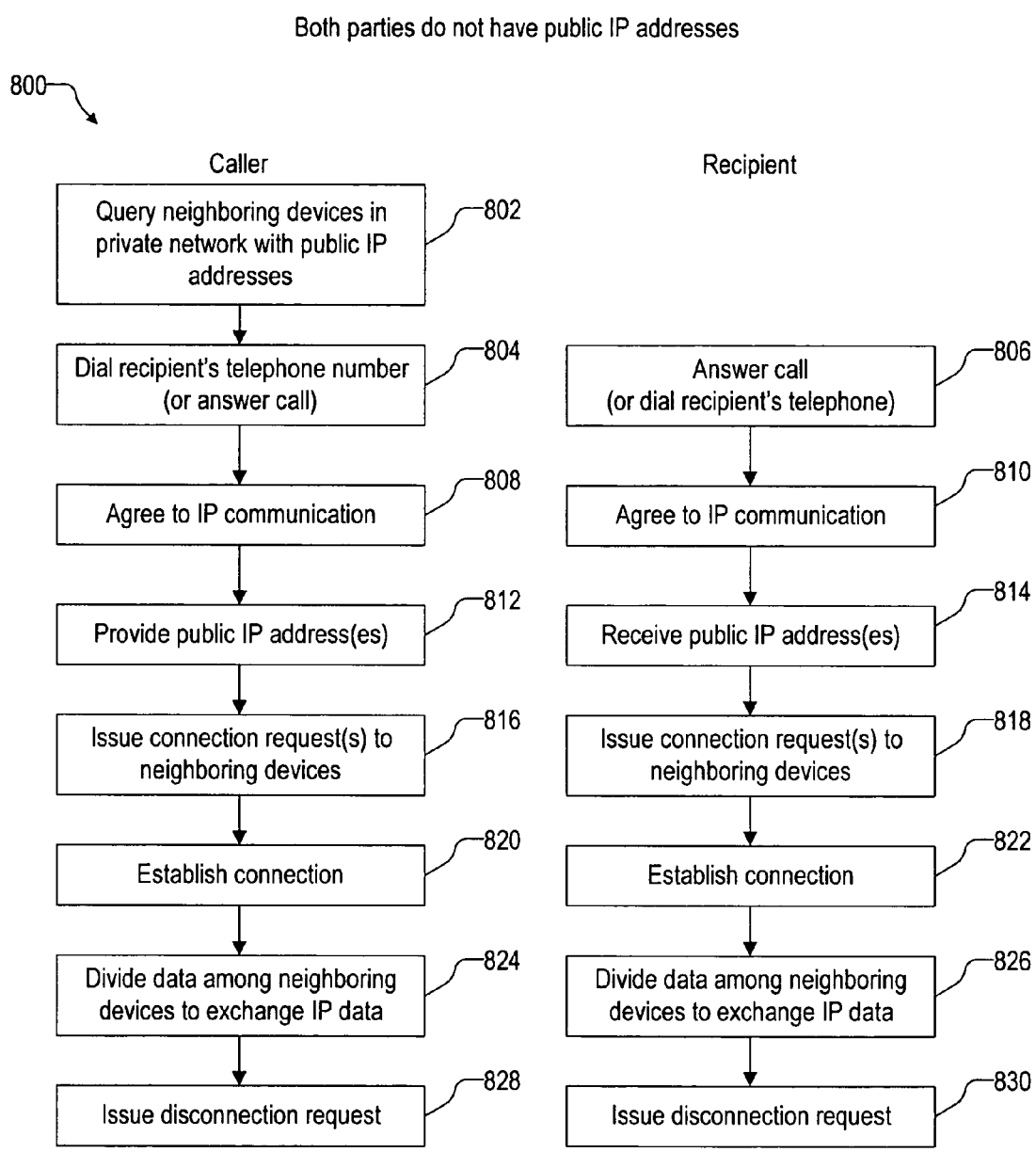

FIG. 8 illustrates a method 800 for two parties to communicate using IP communication system 200 in one embodiment of the invention. Method 800 is used when (1) both IP devices 204 and 206 do not have public IP addresses and (2) PSTN 210 does not allow a modem message from a caller to a recipient between telephone rings. IP devices 204 and 206 may not have public IP addresses because they are connected through private computer networks 207 and 209, respectively, to public computer network 108. For demonstrating method 800, assume a caller is using IP device 204 and a recipient is using IP device 206. The actions of the caller and IP device 204 are shown in the left column while the actions of the recipient and IP device 206 are shown in the right column.

In step 802, IP device 204 queries private computer network 207 for neighboring devices with public IP addresses. Using a router trace command, IP device 204 sends a data packet to a destination on public computer network 108 and traces the route of the data packet. The traced route would include various nodes in private computer network 207 and public computer network 108 traversed by the data packet to reach its destination.

Assume that IP device 204 detects at least the following nodes in the route: (1) 192.168.11.22; (2) 202.101.57.24; and (3) 202.101.48.23. IP device 204 then looks for the closest node with a public IP address. IP device 204 ignores the first node because its IP address has a first octet that indicates the IP address is an internal network address and thus the first node is not connected directly to public computer network 108. Using the IP address of the second node, IP device 204 sends out a user datagram protocol (UDP) data packet each permutation of the IP address with variable third and fourth octets, i.e., 202.101.X.Y (where X and Y are variable octets in the IP address). The UDP data packet requests a neighboring device in this IP address segment to respond with its private IP address on the public IP address on public computer network 108.

One or more neighboring devices will be programmed to respond to the UDP data packet with its private and public IP addresses while other devices would ignore the UDP data packet. IP device 204 constructs a record table for storing these neighboring devices with their private and public IP addresses. To illustrate method 800, assume that neighboring devices 222 and 224 (FIG. 2B) respond to IP device 204 with their public and private IP addresses.

IP device 204 may request a neighboring device to assist in the search for other neighboring devices in the same private computer network. For example, IP device 204 may assign a subset of the IP addresses for the neighboring device to query using UDP data packets. The neighboring device would report back to IP device 204 to complete the record table.

In step 804, the caller uses IP device 204 to dial the recipient's telephone number. IP device 204 dials over PSTN 210 to connect with IP device 206.

In step 806, the recipient uses IP device 206 to answer the telephone call from the caller over PSTN 210. Alternatively, the roles of the caller and the recipient can be reversed.

In steps 808 and 810, parties A and B verbally agree to continue their communication over public computer network 108. In one embodiment, the recipient presses a button on IP device 206 and in response IP device 206 waits to receive one or more public IP addresses from IP device 204 over PSTN 210.

In step 812, the caller instructs IP device 204 to send the public IP addresses of neighboring devices 222 and 224 stored in the record table to IP device 206 over PSTN 210. In one embodiment, the caller presses a button on IP device 204 and in response IP device 204 sends the public IP addresses to IP device 206. As described above, IP device 204 can transmit the one or more public IP addresses as a series of tones or any other type of modem signaling.

In step 814, IP device 206 receives the public IP addresses of neighboring devices 222 and 224 over PSTN 210.

In step 816, IP device 204 issues connection requests to neighboring devices 222 and 224 using their private IP addresses.

In step 818, IP device 206 issue connection requests to neighboring devices 222 and 224 using their public IP addresses. Thus, in steps 816 and 818, IP devices 204 and 206 are essentially login onto and providing their IP addresses to neighboring devices 222 and 224, which are acting as login servers in conventional VoIP (e.g., SIP or H.323).

In step 820, IP device 204 divides the data packets it wishes to send to IP device 206 equally among neighboring devices 222 and 224, which then acts as servers to relay the data packets to IP device 206 or provide address translation so the data packets are sent over public network 108 to IP device 206

In step 822, IP device 206 divides the data packets it wishes to send to IP device 204 equally among neighboring devices 222 and 224, which then acts as servers to relay the data packets to IP device 204 or provide address translation so the data packets are sent over private network 207 to IP device 204.

In steps 824 and 826, IP devices 204 and 206 exchange data packets carrying text, voice, or video communication between parties A and B through their connections over public computer network 108. More specifically, neighboring devices 222 and 224 act as intermediaries between IP devices 204 and 206 to pass data packets between them.

In steps 828 and 830, parties A and B decide to end the communication and instruct IP devices 204 and 206 to terminate their connections over public computer network 108.

Figure 9:
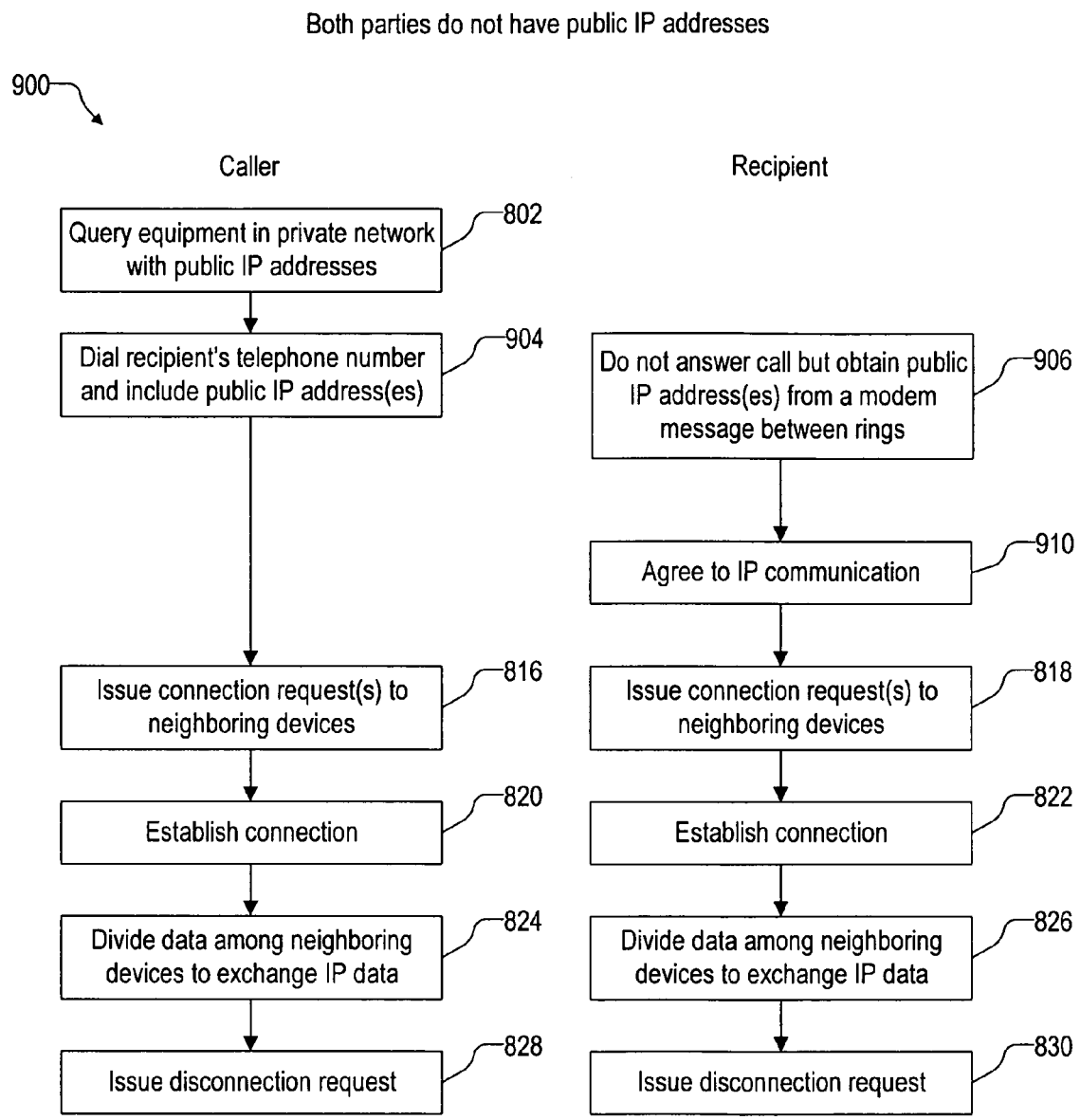

FIG. 9 illustrates a method 900 for two parties to communicate using IP communication system 200 in one embodiment of the invention. Method 900 is used when (1) both IP devices 204 and 206 do not have public IP addresses and (2) PSTN 210 allows a modem message from a caller to a recipient between telephone rings. Method 900 is similar to method 800 except that steps 904, 906, and 910 have replaced steps 804, 806, and 810, and that steps 612 and 614 have been eliminated.

In step 802, IP device 204 queries private computer network 207 for neighboring devices with public IP addresses, and records their public and private addresses in a record table as described above. To illustrate method 900, assume that neighboring devices 222 and 224 (FIG. 2B) respond to IP device 204 with their public and private IP addresses.

In step 904, the caller uses IP device 204 to dial the recipient's telephone number. In response, IP device 204 includes both the recipient's telephone number and the public IP addresses from the record table in the touch-tones used to dial out over PSTN 210. PSTN 210 uses the recipient's telephone number to ring IP device 206 and then transmits a modem message with the public IP addresses of neighboring devices 222 and 224 between telephone rings.

In step 906, IP device 206 does not answer the call from IP device 204 but obtains the public IP addresses of neighboring devices 222 and 224 from the modem message between telephone rings.

In step 910, the recipient agrees to communicate with the caller over public computer network 108. In one embodiment, the recipient presses a button on IP device 206 to accept.

In step 816, IP device 204 issues connection requests to neighboring devices 222 and 224 using their private IP addresses.

In step 818, IP device 206 issue connection requests to neighboring devices 222 and 224 using their public IP addresses.

In step 820, IP device 204 divides the data packets it wishes to send to IP device 206 equally among neighboring devices 222 and 224, which then acts as servers to relay the data packets to IP device 206 or provide address translation so the data packets are sent over public network 108 to IP device 206

In step 822, IP device 206 divides the data packets it wishes to send to IP device 204 equally among neighboring devices 222 and 224, which then acts as servers to relay the data packets to IP device 204 or provide address translation so the data packets are sent over private network 207 to IP device 204.

In steps 824 and 826, IP devices 204 and 206 exchange data packets carrying text, voice, or video communication between parties A and B over their connections over public computer network 108. More specifically, neighboring devices 222 and 224 act as intermediaries between IP devices 204 and 206 to pass data packets between them.

In steps 828 and 830, parties A and B decide to end the communication and instruct IP devices 204 and 206 to terminate their connections over public computer network 108.

Various other adaptations and combinations of features of the embodiments disclosed are within the scope of the invention. Numerous embodiments are encompassed by the following claims.

What is claimed is:

1. A method for using a public switched telephone network (PSTN) to exchange one or more public computer network addresses for point-to-point communication between a first device and a second device over a public computer network, comprising:
   obtaining the one or more public computer network addresses by the first device, comprising:
      tracing a route to the public computer network;
      determining from the route a closest node having a public computer network address;
      sending a data packet to public computer network addresses that are permutations of the public computer network address by varying part of the public computer network address so the data packet reaches one or more neighboring devices in a same private computer network as the first device, the data packet requesting the one or more neighboring devices to respond with their private and public computer network addresses, the one or more neighboring devices being configured to respond to the data packet; and forming a record table listing the one or more public computer network addresses received from the one or more neighboring devices that responded to the data packet;

communicating the one or more public computer network addresses between the first and the second devices over the PSTN;

establishing a connection between the first and the second devices over the public computer network using the one or more public computer network addresses; and exchanging data packets between the first and the second devices over the public computer network.

2. The method of claim 1, wherein said communicating the one or more public computer network addresses comprises:
the first device calling a telephone number associated with the second device; and
the first device providing the one or more public computer network addresses to the second device after the second device answers.

3. The method of claim 1, wherein said communicating the one or more public computer network addresses comprises:
the first device signaling to the PSTN (1) a telephone number associated with the second device and (2) the one or more public computer network addresses;
wherein the PSTN rings the second device and provides a modem message with the one or more public computer network addresses between rings, and the second device does not answer but obtains the one or more public computer network addresses from the modem message between the rings.

4. The method of claim 1, wherein said establishing a connection between the first and the second devices over the public computer network comprises:
the second device sending a connection request to the first device over the public computer network using the one or more public computer network addresses; and
the first device accepting the connection request.

5. The method of claim 1, wherein the data packets carry at least one of text, voice, and video between users at the first and the second devices.

6. The method of claim 1, wherein:
said communicating the one or more pubic computer network addresses comprises the first device sending the one or more public computer network addresses to the second device;
said establishing a connection comprises establishing (1) one or more connections between the first device and the one or more neighboring devices, and (2) one or more connections between the second device and the one or more neighboring devices; and
said exchanging data packets comprises exchanging the data packets between the first and the second devices through the one or more neighboring devices.

7. The method of claim 6, wherein said exchanging data packets comprise the one or more neighboring devices relaying the data packets between the first and the second devices.

8. The method of claim 6, wherein said exchanging data packets comprise the one or more neighboring devices translating network addresses of the data packets between the first and the second devices for routing over the public and the private computer networks.

9. The method of claim 6, wherein said sending the one or more public computer network addresses comprises:
the first device dialing a telephone number associated with the second device; and
the first device providing the one or more public computer network addresses to the second device after the second device answers.

10. The method of claim 6, wherein said sending the one or more public computer network addresses comprises:
the first device signaling to the PSTN (1) a telephone number associated with the second device and (2) the one or more public computer network addresses;
wherein the PSTN rings the second device and provides a modem message with the one or more public computer network addresses between rings, and the second device does not answer but obtains the one or more public computer network addresses from the modem message between the rings.

11. A method for a first device to use a public switched telephone network (PSTN) to exchange one or more public computer network addresses with a second device for point-to-point communication over a public computer network, comprising:
obtaining the one or more public computer network addresses, comprising:
tracing a route to the public computer network;
determining from the route a closest node having a public computer network address;
sending a data packet to public computer network addresses that are permutations of the public computer network address by varying part of the public computer network address so the data packet reaches one or more neighboring devices in a same computer private network as the first device, the data packet requesting the one or more neighboring devices to respond with their private and public network addresses, the one or more neighboring devices being configured to respond to the data packet; and
forming a record table listing the one or more public computer network addresses from the one or more neighboring devices that responded to the data packet;
calling a telephone number associated with the second device over the PSTN or receiving a telephone call from the second device over the PSTN;
providing the one or more public computer network addresses to the second device over the PSTN;
establishing a connection with the second device over the public computer network using the one or more public computer network addresses; and
exchanging data packets with the second device over the public computer network, wherein the data packets carry at least one of text, voice, and video.

12. The method of claim 11, wherein said providing the one or more public computer network addresses is selected from the group consisting of (1) providing the one or more public computer network addresses to the second device after the second device answers and (2) providing the one or more public computer network addresses to the second device in a modem message between telephone rings without the second device answering.

13. The method of claim 12, wherein:
said establishing a connection with the second device comprises establishing one or more connections to the one or more neighboring devices, wherein the second device also establishes one or more connections to the one or more neighboring devices; and
said exchanging data packets comprises exchanging the data packets with the second device through the one or more neighboring devices.

14. The method of claim 13, wherein said exchanging data packets comprises using the one or more neighboring devices to relay the data packets.

15. The method of claim 13, wherein said exchanging data packets comprises using the one or more neighboring devices to translate network addresses of the data packets for routing over the public and the private computer networks.

* * * * *